United States Patent
Hyodo (10) Patent No.: US 9,013,561 B2
(45) Date of Patent: Apr. 21, 2015

(54) STEREOSCOPIC VIDEO PROCESSING APPARATUS, METHOD, AND PROGRAM

(75) Inventor: Katsuya Hyodo, Kanagawa (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 13/576,166

(22) PCT Filed: Feb. 10, 2011

(86) PCT No.: PCT/JP2011/052806
§ 371 (c)(1),
(2), (4) Date: Jul. 31, 2012

(87) PCT Pub. No.: WO2011/105220
PCT Pub. Date: Sep. 1, 2011

(65) Prior Publication Data
US 2012/0293622 A1 Nov. 22, 2012

(30) Foreign Application Priority Data
Feb. 24, 2010 (JP) ................................. 2010-038382

(51) Int. Cl.
  *H04N 13/04* (2006.01)
  *H04N 13/00* (2006.01)
  *G02B 27/22* (2006.01)

(52) U.S. Cl.
  CPC ........ *H04N 13/0022* (2013.01); *G02B 27/2214* (2013.01); *H04N 2213/002* (2013.01)

(58) Field of Classification Search
  USPC .......................................................... 348/51
  See application file for complete search history.

(56) References Cited

U.S. PATENT DOCUMENTS

| 8,610,774 B2 * | 12/2013 | Onozawa ...................... 348/143 |
| 2009/0244268 A1 * | 10/2009 | Masuda et al. .................. 348/51 |
| 2011/0109731 A1 * | 5/2011 | Koo et al. ........................ 348/51 |
| 2011/0205343 A1 | 8/2011 | Hyodo et al. |

FOREIGN PATENT DOCUMENTS

| JP | 10 40420 | 2/1998 |
| JP | 11 164328 | 6/1999 |
| JP | 2001-320734 A | 11/2001 |

(Continued)

OTHER PUBLICATIONS

International Search Report Issued Apr. 26, 2011 in PCT/JP11/052806 Filed Feb. 10, 2011.

*Primary Examiner* — Jefferey Harold
*Assistant Examiner* — Humam Satti
(74) *Attorney, Agent, or Firm* — Oblon, McClelland, Maier & Neustadt, L.L.P.

(57) ABSTRACT

The invention relates to a stereoscopic video processing apparatus, method, and program that can reduce visual fatigue on watching a stereoscopic video. A scene change detecting unit (61) accumulates, in an internal buffer or the like, frames corresponding to a stereoscopic video for three seconds extracted from a stereoscopic video signal, and specifies a scene change frame. A parallax adjusting unit (62) acquires a frame that precedes the specified scene change frame by three seconds and a frame that lags behind the scene change frame by three seconds, based on a frame number for the scene change frame specified by the scene change detecting unit (61), and calculates a parallax coefficient α by specifying a maximum parallax value in the two frames. Thus, the value of the maximum parallax of a parallax plane is adjusted by using the parallax coefficient.

7 Claims, 11 Drawing Sheets

(56) References Cited

FOREIGN PATENT DOCUMENTS

| JP | 2009-239388 | 10/2009 |
| JP | 2009 239388 | 10/2009 |
| WO | 2010 123053 | 10/2010 |

* cited by examiner

FRAME NUMBERED P

| 0 | 0 | 0 | 0 | 0 | 0 | 0 |
|---|---|---|---|---|---|---|
| 0 | 0 | 1 | 1 | 0 | 0 | 0 |
| 0 | 0 | 1 | 1 | 0 | 0 | 0 |
| 0 | 0 | 1 | 1 | 0 | 0 | 0 |
| 0 | 0 | 1 | 1 | 0 | 0 | 0 |
| 0 | 0 | 1 | 1 | 0 | 0 | 0 |
| 0 | 0 | 0 | 0 | 0 | 0 | 0 |
| 0 | 0 | 0 | 0 | 0 | 0 | 0 |

RIGHT EYE PLANE

| 0 | 0 | 0 | 0 | 0 | 0 | 0 |
|---|---|---|---|---|---|---|
| 0 | 0 | 0 | 0 | 1 | 1 | 0 |
| 0 | 0 | 0 | 0 | 1 | 1 | 0 |
| 0 | 0 | 0 | 0 | 1 | 1 | 0 |
| 0 | 0 | 0 | 0 | 1 | 1 | 0 |
| 0 | 0 | 0 | 0 | 1 | 1 | 0 |
| 0 | 0 | 0 | 0 | 0 | 0 | 0 |
| 0 | 0 | 0 | 0 | 0 | 0 | 0 |

LEFT EYE PLANE

| 0 | 0 | 0 | 0 | 0 | 0 | 0 |
|---|---|---|---|---|---|---|
| 0 | 0 | 2 | 2 | 0 | 0 | 0 |
| 0 | 0 | 2 | 2 | 0 | 0 | 0 |
| 0 | 0 | 2 | 2 | 0 | 0 | 0 |
| 0 | 0 | 2 | 2 | 0 | 0 | 0 |
| 0 | 0 | 2 | 2 | 0 | 0 | 0 |
| 0 | 0 | 0 | 0 | 0 | 0 | 0 |
| 0 | 0 | 0 | 0 | 0 | 0 | 0 |

PARALLAX PLANE

STEREOSCOPIC VIDEO PROCESSING APPARATUS, METHOD, AND PROGRAM

TECHNICAL FIELD

The present invention relates to a stereoscopic video processing apparatus, method, and program and, in particular, to a stereoscopic video processing apparatus, method, and program that can reduce visual fatigue on watching a stereoscopic video.

BACKGROUND ART

Humans stereoscopically recognize an object by using a difference (parallax) between an image caught by the right eye and an image caught by the left eye. The rotational movements of the eyeballs change the angle of vergence, and humans recognize this as a distance to an object. The angle of vergence is an angle formed by two line's of vision which cross each other.

When two two-dimensional images for the left eye and the right eye, which have a parallax therebetween, are prepared by using characteristics of the eyes of humans, and then separately projected on the left eye and the right eye, the distance to an object is deluded due to the angle of vergence. This gives humans stereoscopic perception. Here, the parallax is a difference between an image for the left eye and an image for the right eye.

An image obtained by displaying an image for the left eye and an image for the right eye is called a stereoscopic image. An image obtained by preparing a plurality of images for the left eye and a plurality of images for the right eye and continuously changing the prepared images is called a stereoscopic video. Moreover, an apparatus that can display the stereoscopic video is called a stereoscopic video display apparatus.

Further, a stereoscopic video display apparatus has been proposed which alternately displays images for the right eye and images for the left eye on a display in such a manner that a parallax exists therebetween by using shutter glasses in which a pair of left and right lens units is alternately switched between a perspective state and a light shielding state. This apparatus does not require a switching operation of the shutter glasses because the left and right lens units are controlled to be alternately switched between the perspective state and the light shielding state in synchronization with timing at which the images for the right eye and the images for the left eye are alternately switched (for example, refer to Patent Document 1).

CITATION LIST

Patent Document

Patent Document 1: Japanese Patent Application Laid-Open No. 2001-320734

SUMMARY OF THE INVENTION

Problems to be Solved by the Invention

However, for example, when a scene change occurs, a temporal discontinuity in parallax change tends to occur in a stereoscopic video because quite different images are continuously displayed.

For example, it is assumed that a two-dimensional object without a parallax is displayed before the scene change and a stereoscopic object with a parallax is displayed after the scene change. In this case, since the angle of vergence α to see the two-dimensional object and the angle of vergence β to see the stereoscopic object are greatly different, a viewer is required to rotate the eyeballs and to rapidly change the angle of vergence.

The adjustment of the angle of vergence that follows the rapid change in parallax was considered the cause of visual fatigue, and the conventional art could not solve the problem, for example, the visual fatigue attributable to the scene change.

The present invention is made in view of such a situation, and is intended to reduce visual fatigue when watching a stereoscopic video.

Solutions to Problems

An aspect of the present invention is a stereoscopic video processing apparatus including: a frame specifying unit that specifies a frame that causes a temporal discontinuity in change of maximum parallax value among frames of a stereoscopic video signal that includes frame rate for a unit time; a maximum parallax specifying unit that specifies a maximum parallax value of a first frame that precedes a reference frame by a predetermined time when the specified frame is set as the reference frame, and a maximum parallax value of a second frame that lags behind the reference frame by the predetermined time; a parallax coefficient calculating unit that sets frames between the first frame and the second frame as a processing target frame and calculates a parallax coefficient that is coefficient used to adjust the maximum parallax value of the processing target frame such that changes in the maximum parallax value are continuous over time based on the maximum parallax value of the first frame, the maximum parallax value of the second frame, and the maximum parallax value of the processing target frame; and a parallax adjusting unit that adjusts the maximum parallax value of the processing target frame by multiplying the maximum parallax value by the calculated parallax coefficient.

A parallax of each of the frames of the stereoscopic video signal may be information contained in each of the frames of the stereoscopic video signal, and may be specified based on a parallax plane that indicates a parallax for each pixel.

The parallax of each of the frames of the stereoscopic video signal may be specified by calculating a difference in pixel between right eye image data and left eye image data that are contained in each frame of the stereoscopic video signal.

The frame specifying unit may specify the frame which causes a temporal discontinuity in change of the maximum parallax value by detecting a scene change frame in a video of the stereoscopic video signal.

The frame specifying unit may specify the frame which causes a temporal discontinuity in change of the maximum parallax value based on a difference in the maximum parallax value between two frames that are temporally consecutive.

An aspect of the present invention is a method of processing a stereoscopic video, the method including: at a frame specifying unit, specifying a frame which causes a temporal discontinuity in change of maximum parallax value among frames of a stereoscopic video signal that has frame rate for each unit time; at a maximum parallax specifying unit, setting the specified frame as a reference frame, and specifying a maximum parallax value of a first frame that precedes the reference frame by a predetermined time and a maximum parallax value of a second frame that lags behind the reference frame by the predetermined time; at a parallax coefficient calculating unit, setting a frame between the first frame and the second frame as a processing target frame, and calculating a parallax coefficient that is coefficient used to adjust a maximum parallax value of the processing target frame so that changes in the maximum parallax value are temporally continuous, based on the maximum parallax value of the first frame, the maximum parallax value of the second frame, and the maximum parallax value of the processing target frame; and at a parallax adjusting unit, adjusting the maximum parallax value of the processing target frame by multiplying the maximum parallax value of the processing target frame by the calculated parallax coefficient.

An aspect of the present invention is a program causing a computer to function as a stereoscopic video processing apparatus, the stereoscopic vide processing apparatus including: a frame specifying unit that specifies a frame that causes a temporal discontinuity in change of maximum parallax value among frames of a stereoscopic video signal that includes frame rate for a unit time; a maximum parallax specifying unit that specifies a maximum parallax value of a first frame that precedes a reference frame by a predetermined time and a maximum parallax value of a second frame that lags behind the reference frame by the predetermined time when the specified frame is set as the reference frame; a parallax coefficient calculating unit that sets frames between the first frame and the second frame as a processing target frame and calculates a parallax coefficient that is coefficient used to adjust the maximum parallax value of the processing target frame such that changes in the maximum parallax value are continuous over time based on the maximum parallax value of the first frame, the maximum parallax value of the second frame, and the maximum parallax value of the processing target frame; and a parallax adjusting unit that adjusts the maximum parallax value of the processing target frame by multiplying the maximum parallax value by the calculated parallax coefficient.

According to one aspect of the present invention, a frame which causes a temporal discontinuity in change of maximum parallax value is specified among frames of a stereoscopic video signal that includes frame rate for a unit time, the specified frame is set as a reference frame, a maximum parallax value of a first frame that precedes the reference frame by a predetermined time and a maximum parallax value of a second frame that lags behind the reference frame by the predetermined time are specified, frames between the first frame and the second frame are set as processing target frames, parallax coefficients are calculated based on the maximum parallax value of the first frame, the maximum parallax of the second frame, and maximum parallax values of the processing target frames in which the parallax coefficients are coefficient used to adjust the maximum parallax values of the processing target frames such that changes in the maximum parallax value are continuous over time, and the maximum parallax values of the processing target frames are adjusted by being multiplied by the calculated corresponding coefficients.

Effects of the Invention

According to the present invention, visual fatigue on watching a stereoscopic video can be reduced.

MODE FOR CARRYING OUT THE INVENTION

Hereafter, embodiments of the present invention will be described with reference to the accompanying drawings.

First, the display mechanism of a stereoscopic video is described.

Figure 1:
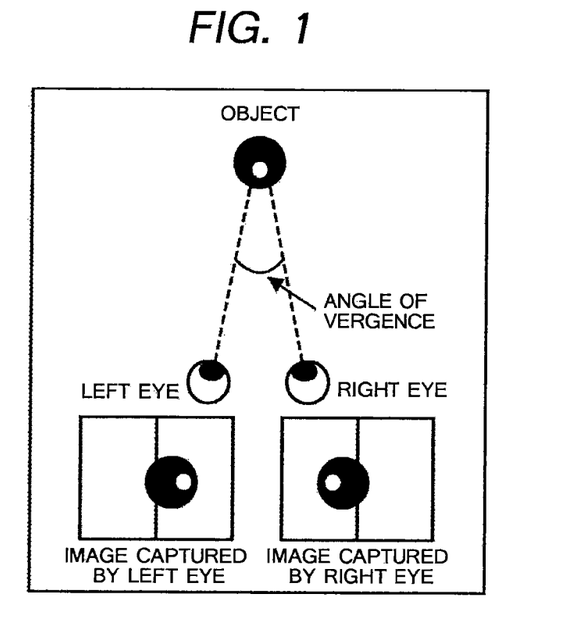
FIG. 1 is a diagram that describes the mechanism that humans' eyes recognize a stereoscopic video.

FIG. 1 is a diagram that describes the mechanism that human being's eyes recognize a stereoscopic video.

As illustrated in the same drawing, humans stereoscopically recognize an object using a difference (parallax) between an image captured by the left eye and an image captured by the right eye. In the example of FIG. 1, the same object of a circular shape appears in both of the image captured by the left eye and the image captured by the right eye, but is displayed in different positions in the images.

To focus the lines of vision on an object to which a human being pays attention, the eyeballs of the right eye and the left eye will be rotated. The rotational movements of the eyeballs change the angle of vergence, and the human being recognizes the distance to the object by the angle of vergence. As a result, the human being recognizes a stereoscopic video. Here, the angle of vergence is an angle formed by the lines of vision that cross each other.

Figure 2:
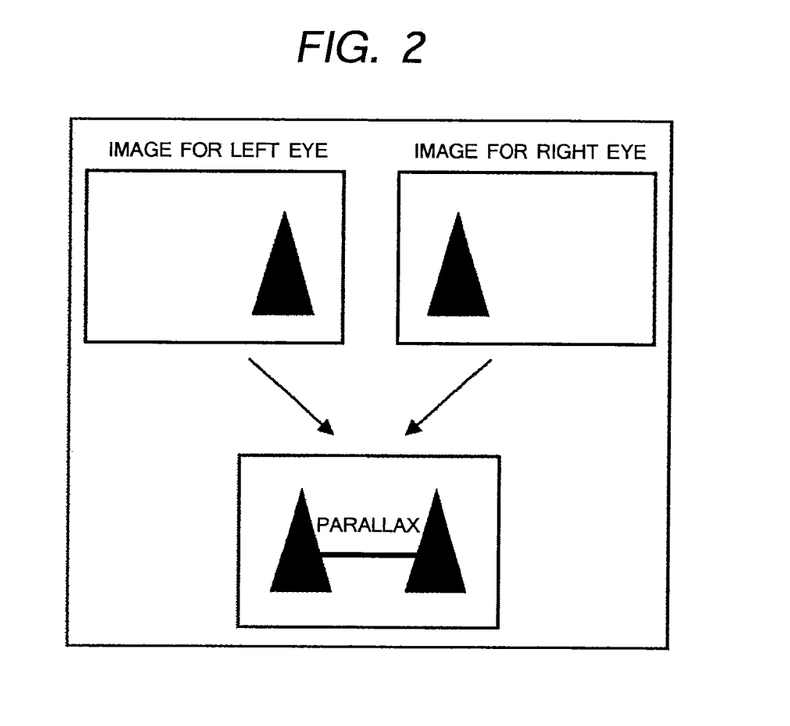
FIG. 2 is a diagram that illustrates an example of an image for the left eye and an image for the right eye that have a parallax therebetween.

Therefore, for example, when a stereoscopic video is displayed on a two-dimensional display unit, the display may be achieved by preparing an image for the right eye and an image for the left eye that have a parallax therebetween. As illustrated in FIG. 2, for example, when an image for the right eye and an image for the left eye that have a parallax therebetween are displayed on a two-dimensional display unit at the same time, a triangular object in the diagram can be stereoscopically displayed (for example, the object appears to project out from the display unit) due to the parallax.

Further, since an image for the right eye and an image for the left eye are displayed, for example, in red light and blue light, respectively in a superimposed manner and are separated by glasses to which a red filter and a blue filter are respectively attached, they are observed by the left eye and the right eye of humans.

Figure 3:
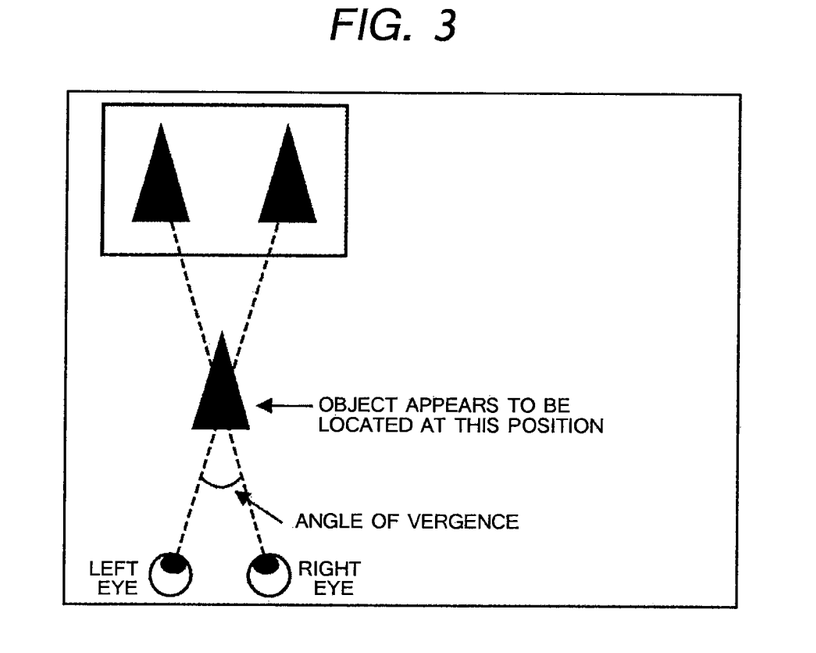
FIG. 3 is a diagram that illustrates an example in which a stereoscopic video illustrated in FIG. 2 is observed by humans.

FIG. 3 is a diagram that illustrates an example in which the stereoscopic video illustrated in FIG. 2 is observed by humans. As illustrated in the same drawing, the line of vision of the left eye is focused on the almost center of an object in an image for the left eye and the line of vision of the right eye is focused on the almost center of an object in an image for the right eye. This gives a sensation that the object appears to project out at the position where the line of vision of the left eye and the line of vision of the right eye, which are illustrated with dotted lines, cross each other.

However, for example, when a scene change occurs in the stereoscopic video, a temporal discontinuity in parallax change is likely to occur because quite different images are continuously displayed.

Figure 4:
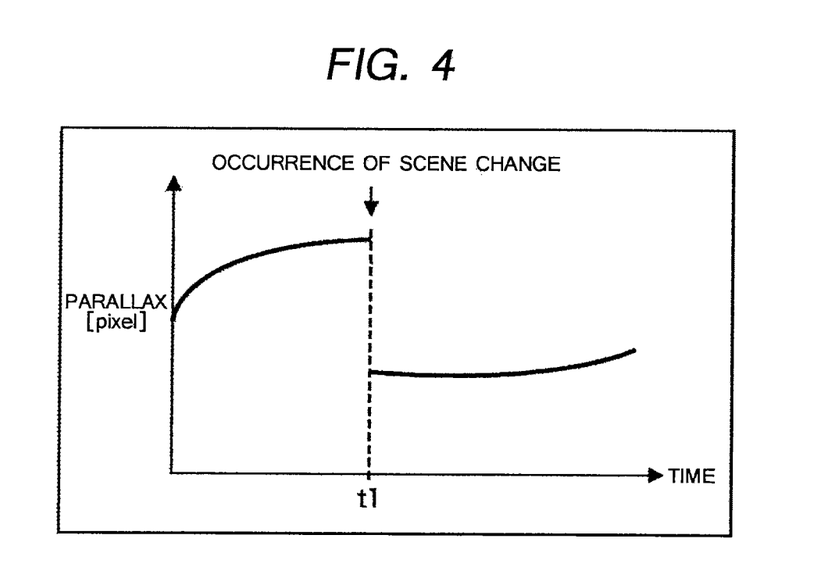
FIG. 4 is a diagram that illustrates a change in parallax over time as a graph.

FIG. 4 is a diagram that illustrates changes in parallax over time as a graph in which the horizontal axis indicates time, and the vertical axis represents a maximum parallax value at each point in time in a stereoscopic video. In the example of the same drawing, the scene change occurs at time point t1.

In the graph of FIG. 4, the discontinuous change occurs at time point t1. That is, the temporal discontinuity in parallax change occurs in the stereoscopic video.

The adjustment of the angle of vergence attributable to such a rapid parallax change is thought to be accompanied by visual fatigue. To simplify the description, the scene change is assumed such that, for example, in a video, a scene in which an object being paid attention to is displayed two-dimensionally is changed to a scene in which the object is stereoscopically displayed.

Figure 5:
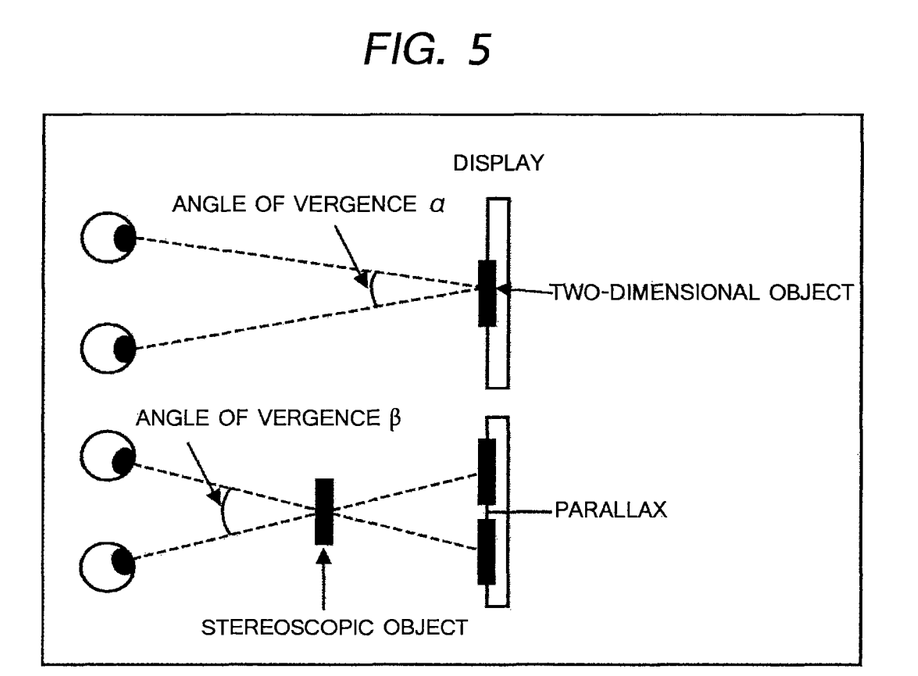
FIG. 5 is a diagram that describes a change in angle of vergence of the lines of vision when a stereoscopic video is observed.

For example, in the scene in which the object is two-dimensionally displayed as illustrated in FIG. 5, the eyeballs of the left eye and the right eye of a human being are turned in the direction in which the angle of vergence between the lines of vision becomes α. When the scene change occurs immediately after that and thus the scene is switched to the scene in which the object is stereoscopically displayed, the eyeballs of the left eye and the right eye are rotated so that the angle of vergence between the lines of vision lines becomes β3. In this way, the rapid rotation of the eyeballs results in the visual fatigue.

The study on the change in the angle of vergence and the visual fatigue is reported in articles, such as "An Ergonomic Evaluation System for Stereoscopic 3-D images by Shinsuke Kishi et al., The Journal of The Institute of Image Information and Television Engineers Vol. 60 (2006) No. 6 pp. 934-942", and "3-D images and Human Science by Hiroshi Harashima et al., Ohmsha, Ltd., 2000."

Accordingly, the present invention prevents the temporal discontinuity in parallax change from occurring in a stereoscopic video.

Figure 6:
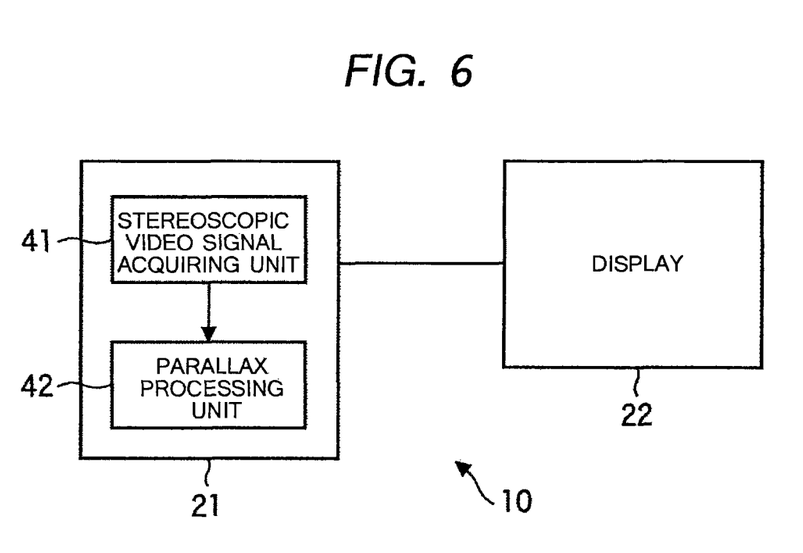
FIG. 6 is a block diagram that illustrates an example of a configuration of a stereoscopic video display system according to an embodiment of the present invention.

FIG. 6 is a block diagram that illustrates an example of a configuration of a stereoscopic video display system according to an embodiment of the present invention. As illustrated in the same drawing, a stereoscopic video display system 10 is configured to include a stereoscopic video display device 21 and a display 22.

The stereoscopic video display device 21 is configured to include a stereoscopic video signal acquiring unit 41 and a parallax processing unit 42 inside thereof.

The stereoscopic video signal acquiring unit 41 is configured to include a unit, such as a tuner, which receives a stereoscopic video signal transmitted as a broadcast wave. Moreover, the stereoscopic video signal acquiring unit 41 may be configured by using a unit, such as a drive, which reads a stereoscopic video signal recorded in a recording medium, such as a DVD or an HDD.

The parallax processing unit 42 is assumed to be a functional block that performs processing of correcting a signal, e.g., the stereoscopic video signal acquired by the stereoscopic video signal acquiring unit 41 so that there is no temporal discontinuity in parallax change in a stereoscopic video. The configuration of the parallax processing unit 42 is described later in detail with reference to FIG. 7.

The display 22 is configured by using an LCD (Liquid Crystal display) or the like and is assumed to have a two-dimensional image display area. The user is assumed to watch the stereoscopic video displayed on the display 22 while wearing, for example, glasses provided with color filters, or the like.

Moreover, the display 22 may be configured to include a screen or the like and the stereoscopic video projected from the stereoscopic video display device 21 may be displayed on the screen. In addition, the stereoscopic video display system 10 may be configured in the form in which the stereoscopic video display device 21 and the display 22 are integrally formed.

Figure 7:
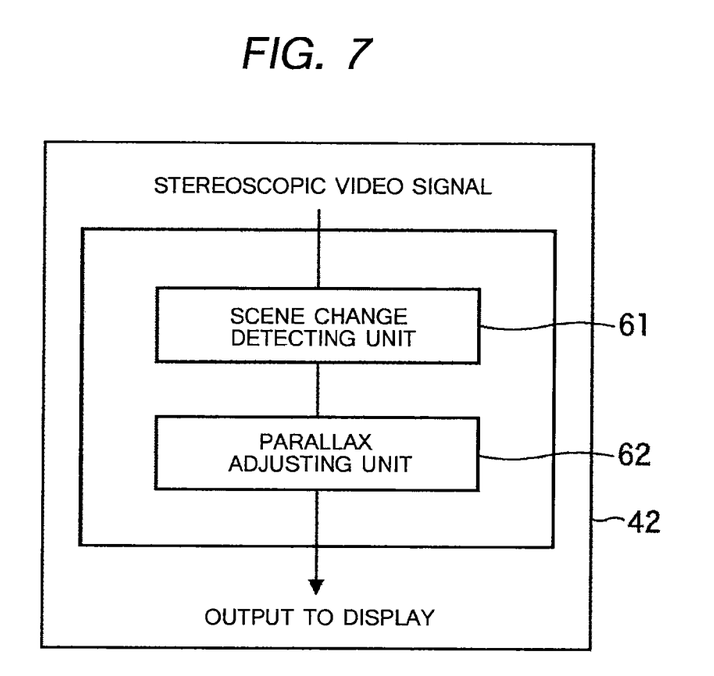
FIG. 7 is a block diagram that illustrates an example of a detailed configuration of a parallax processing unit illustrated in FIG. 6.

FIG. 7 is a block diagram that illustrates an example of a detailed configuration of the parallax processing unit 42 of FIG. 6. As illustrated in the same drawing, the parallax processing unit 42 is configured to include a scene change detecting unit 61 and a parallax adjusting unit 62.

The scene change detecting unit 61 specifies a scene change frame, at which the scene changes, from the stereoscopic video signal. The scene change detecting unit 61 accumulates, in an internal buffer or the like, frames of the stereoscopic video signal corresponding to, for example, a stereoscopic video for three seconds and specifies the scene change frame.

Figure 8:
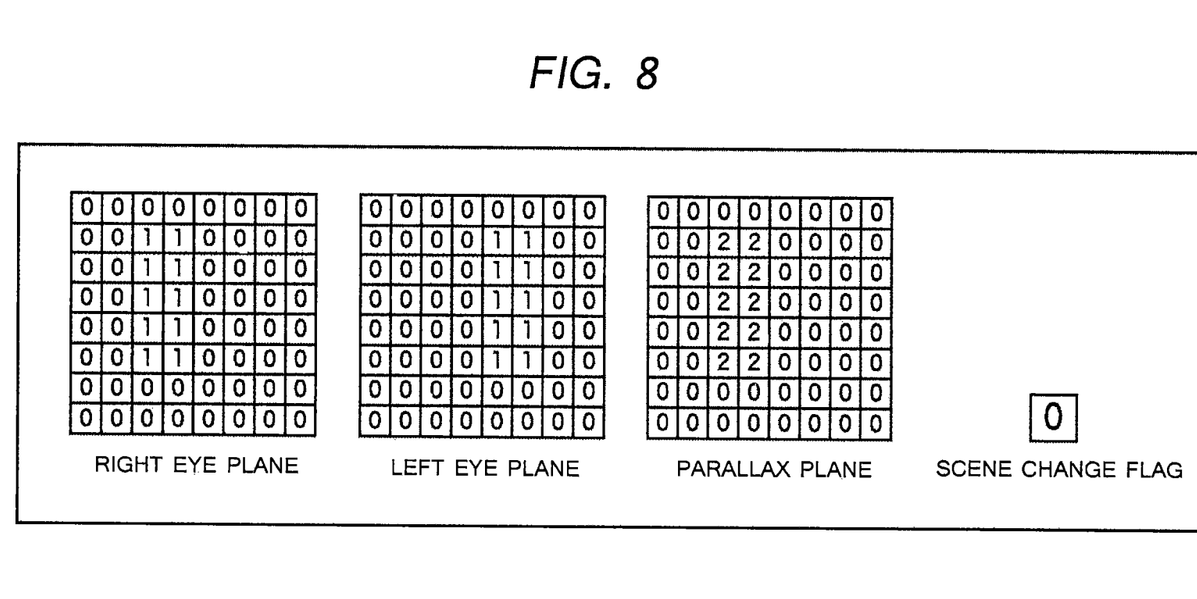
FIG. 8 is a diagram that illustrates an example of a configuration of a frame of a stereoscopic video signal.

FIG. 8 is a diagram that describes a configuration of a frame of the stereoscopic video signal. The stereoscopic video signal includes frames. FIG. 8 illustrates information contained in one frame of the stereoscopic video signal. Moreover, the stereoscopic video signal that is a signal to display a moving image is assumed to include 60 frames in a second. That is, the stereoscopic video for one second can be displayed by the stereoscopic video signal corresponding to 60 frames.

In the example of FIG. 8, the frame of the stereoscopic video signal includes a right eye plane, a left eye plane, a parallax plane, and a scene change flag. Moreover, besides those, information such as a frame header, an error detection bit, and the like is further contained as appropriate.

The right eye plane and the left eye plane are considered as image data for one screen to be displayed on the display 22. In addition, in the example of FIG. 8, to simplify the description, the image for one screen to be displayed on the display 22 is assumed to include 64 (=8×8) pixels, and each rectangle in the right eye plane and the left eye plane represents one pixel.

Each of the right eye plane and the left eye plane includes 64 rectangles, and "0" or "1" is recorded in each rectangle. Here, to simplify the description, the rectangles with "0" in the diagram are assumed to represent black pixels and the rectangles with "1" in the diagram are assumed to represent white pixels.

In the example of FIG. 8, illustrated is an image in which an object of 2×4 white pixels is displayed on the black background, and the object of 2×4 white pixels is displayed in different positions in the right eye plane and the left eye plane. That is, as previously described with reference to FIG. 3, images having a parallax are displayed and thus a sensation that the object appears to project out from the screen is obtained.

The difference in the display position between the right eye plane and the left eye plane can be specified by the parallax plane. The parallax plane has 64 rectangles corresponding to the respective pixels of each of the right eye plane and the left eye plane, and is assumed to be information that represents by how many pixels the right eye plane is shifted from the left eye plane. In the example of FIG. 8, "2" is recorded in each of the rectangles at the positions where 2×4 white pixels forming the object are displayed in the right eye plane. This implies that the object of 2×4 white pixels in the right eye plane is displaced by two pixels with respect to the left eye plane.

The scene change flag is a flag for confirmation of the occurrence of the scene change. For example, the scene change flag is made up of a bit representing "0" or "1". When the scene change flag represents "1", it implies that the scene change occurs in the following frame. In the example of FIG. 8, since "0" is recorded as the scene change flag, the example implies that the scene change does not occur in the following frame.

Although not illustrated in FIG. 8, each of the frames of the stereoscopic video signal is given a frame number that shows the order of the frame when counted from the leading frame.

Figure 9:
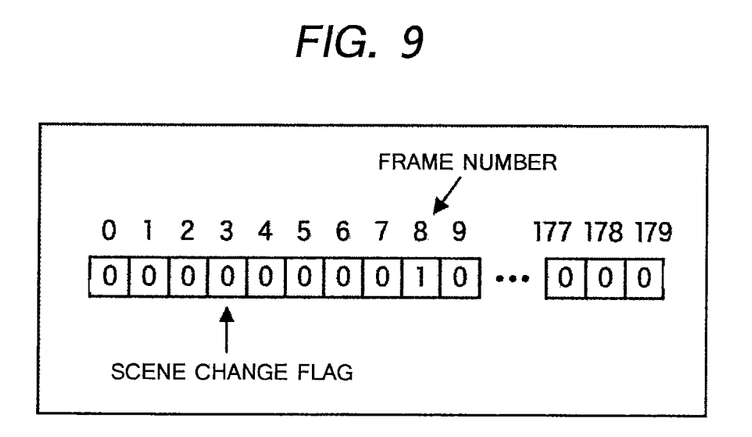
FIG. 9 is a diagram that illustrates an example of a scene change flag sequence.

As described above, the scene change detecting unit 61 accumulates, in an internal buffer or the like, the frames of the stereoscopic video signal corresponding to, for example, a stereoscopic video for three seconds and specify a scene change frame. That is, the frames shown in FIG. 8 are accumulated in 180 (=3×60) buffers. The scene change detecting unit 61 extracts the scene change detection flags from the 180 frames that are accumulated, and generates a scene change flag sequence. FIG. 9 is a diagram that illustrates an example of the scene change flag sequence.

In the example of FIG. 9, the scene change flag sequence is generated by associating the scene change detection flags with the frame numbers, respectively. In addition, the leading frame (that is, the frame at the beginning of the image) is assumed to be named frame number 0. In this example, the scene change flag sequence is generated with scene change detection flags of 180 frames (corresponding to three seconds) named frame number 0 to 179.

In the example of FIG. 9, since the scene change detection flag corresponding to frame number 8 is set to "1", it can be understood that the scene changes at the frame with frame number 9. That is, the scene shown in the images of the frames with frame number 0 to 8 is different from the scene shown in the images of the frames with frame number 9 to 179.

The parallax adjusting unit 62 acquires the frames of the stereoscopic video signal based on the frame number given to the scene change frame specified by the scene change detecting unit 61, and accumulates them in the internal buffer or the like. Here, the scene change frame specified by the scene change detecting unit 61 is the frame of which the scene change detection flag is "1", and is the frame with frame number 8 in the example of FIG. 9.

For example, when the frame number given to the frame specified by the scene change detecting unit 61 is assumed to be P, the frame with frame number P−180 and the frame with frame number P+180 are acquired and accumulated (stored). That is, a frame that precedes the scene change frame by three seconds and a frame that lags behind the scene change frame by three seconds are acquired.

In addition, for example, as in the example illustrated in FIG. 9, when the frame with frame number P−180 does not exist, for example, the frame with frame number 0 may be acquired instead of that frame.

The parallax adjusting unit 62 specifies the maximum parallax value in the two frames mentioned above. That is, the maximum value among numerical values in the parallax planes of the respective frames is specified. Here, the maximum parallax value of the frame with frame number P−180 is assumed to be Db, and the maximum parallax value of the frame with frame number P+180 is assumed to be Da.

Next, the parallax adjusting unit 62 calculates a parallax coefficient α that is coefficient used to adjust the maximum parallax value of a processing target frame of signal correction processing such that there is no temporal discontinuity in parallax change, by using Expression (1).

[Expression 1]

$$\alpha = \frac{(Pc - (P - 3F))(Da - Db) + 6FDb}{6FDc} \quad (1)$$

Wherein, in Expression (1), Pc is the frame number for the processing target frame, and Dc is the maximum parallax value of the frame with the frame number Pc. Moreover, F in Expression (1) is a value which represents the number of frames for one second, and the value of F in the previously described example becomes 60.

The parallax coefficient α is calculated for each processing target frame.

That is, for each of the frames, from the frame with frame number P−180 to the frame with frame number P+180, the parallax coefficient α is calculated individually.

Figure 10:
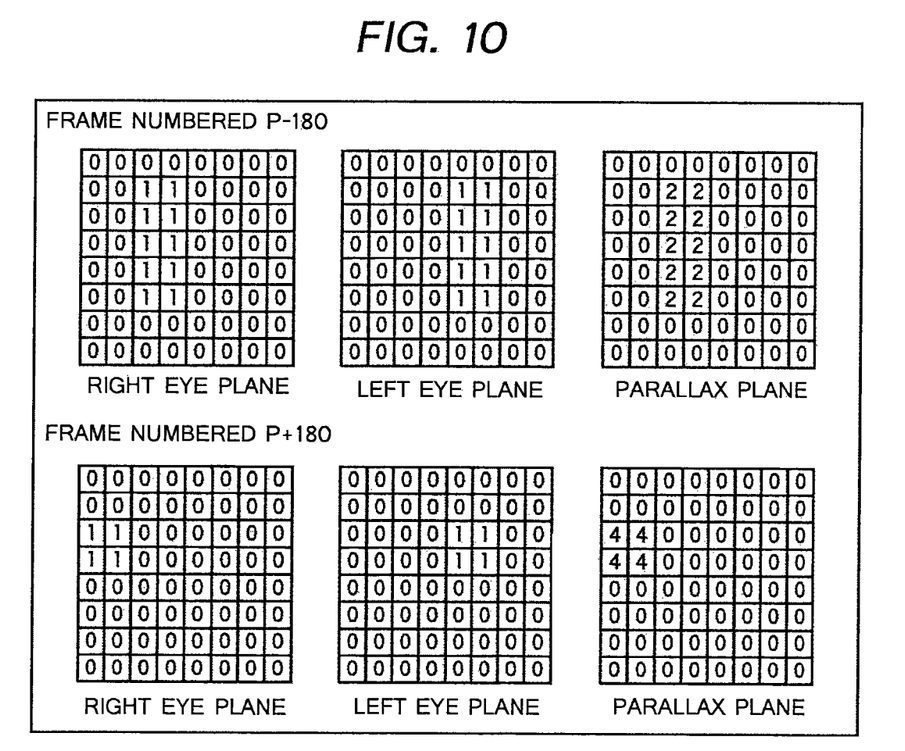
FIG. 10 is a diagram that illustrates right eye planes, left eye planes, and parallax planes of a frame with frame number P−180 and a frame with frame number P+180.

For example, it is assumed that right eye planes, left eye planes, and parallax planes of the frames with frame number P−180 and frame number P+180 are illustrated in FIG. 10. The parallax processing unit 42 specifies the maximum value among numerical values of the parallax planes of the two frames as the maximum parallax value. In this case, the value of Da becomes 4 and the value of Db becomes 2.

When the values are substituted for F, Da, and Db into Expression (1), Expression (2) is obtained.

[Expression 2]

$$\alpha = \frac{2(Pc - (P - 180)) + 720}{360Dc} \quad (2)$$

The parallax adjusting unit 62 adjusts the maximum parallax of each of the frames, from the frame with frame number P−180 to the frame with frame number P+180, by using the parallax coefficients α that have been calculated in the previously described manner. For example, the frame number of the frame at which the scene change actually occurs is substituted into P in Expression (2) described above, the frame number of the processing target frame is substituted into Pc, and the maximum parallax value is substituted into Dc, so that α is calculated for each of the frame numbers respectively provided for the processing target frames.

Next, the parallax adjusting unit 62 adjusts (corrects) the maximum parallax of the frame with frame number Pc by multiplying a by the value of Dc. In addition, the frames, from the frame with frame number P−180 to the frame with frame number P+180, are assumed to be processing target frames, and each of the parallax coefficients α that are individually calculated is multiplied by the maximum parallax value of each frame.

Figure 11:
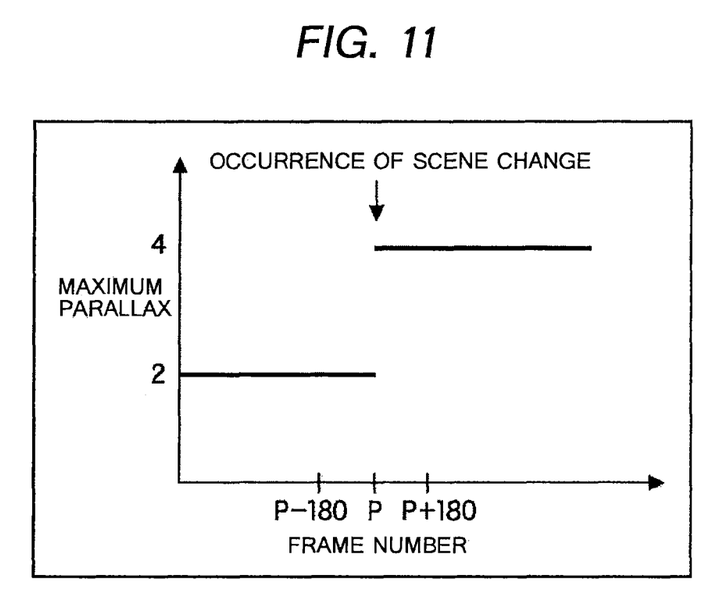
FIG. 11 is a graph that illustrates changes in the maximum parallax value of a stereoscopic video signal before processing by the parallax processing unit is performed.
Figure 12:
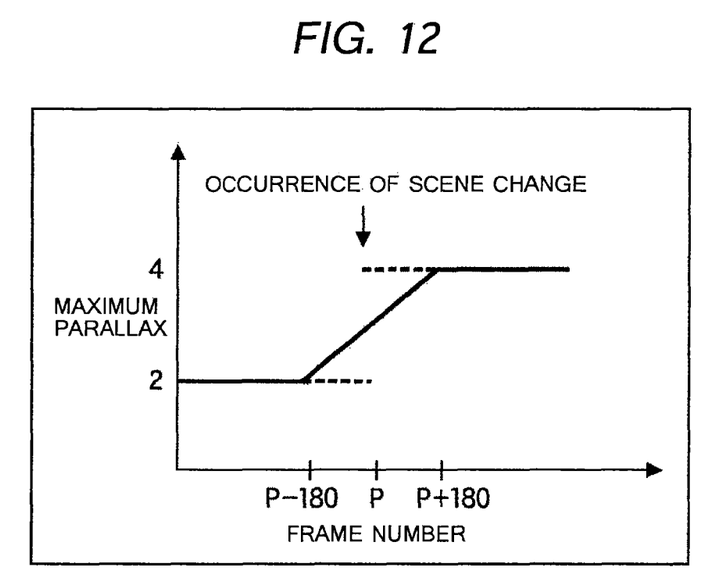
FIG. 12 is a graph that illustrates changes in the maximum parallax value of the stereoscopic video signal after the processing by the parallax processing unit is performed.

Referring to FIGS. 11 and 12, the description is made further in detail. To simplify the description, the maximum parallax value of each of the frames, from the frame with frame number 0 to the frame with frame number P, is assumed to be always 2, and the maximum parallax value of each of the frames, from the frame with frame number P+1 to the last frame, is assumed to be always 4.

FIG. 11 is a graph that illustrates changes in the maximum parallax value of the stereoscopic video signal before the processing performed by the parallax processing unit 42 is performed. In the same drawing, the horizontal axis indicates frame numbers, the vertical axis indicates values of parallax, and the scene change frame is the frame with frame number P. As illustrated in the same drawing, changes in the maximum parallax value are discontinuous between the frame with frame number P and the frame with frame number P+1.

FIG. 12 is a graph that illustrates changes in the maximum parallax value of the stereoscopic video signal after the processing by the parallax processing unit 42 is performed. In the same drawing, similar to the case of FIG. 11, the horizontal axis indicates frame numbers, the vertical axis indicates values of parallax, and the scene change frame is assumed to be the frame with frame number P. In the graph of the same drawing, the changes in the maximum parallax value of the stereoscopic video signal which has undergone the processing by the parallax processing unit 42 are indicated by a solid line, and the changes in the maximum parallax value of the stereoscopic video signal which has not undergone the processing by the parallax processing unit 42 are indicated by a dotted line.

As illustrated in FIG. 12, through the processing performed by the parallax processing unit 42, the maximum parallax of each of the frames, from the frame with frame number P+180 to the frame with frame number P−180, is individually adjusted.

That is, the maximum parallaxes of the frames, from the frame with frame number P−180 to the frame with frame number P, are adjusted to be increased compared to the original values, and the maximum parallaxes of the frames, from the frame with frame number P+1 to the frame with frame number P+180, are adjusted to be decreased compared to the original values. As a result, the maximum parallaxes have been adjusted so as to be gradually increased in a direction from the frame with frame number P−180 to the frame with frame number P+180.

That is, the processing of correcting a signal such that there is no temporal discontinuity in parallax change has been performed.

Figure 13:
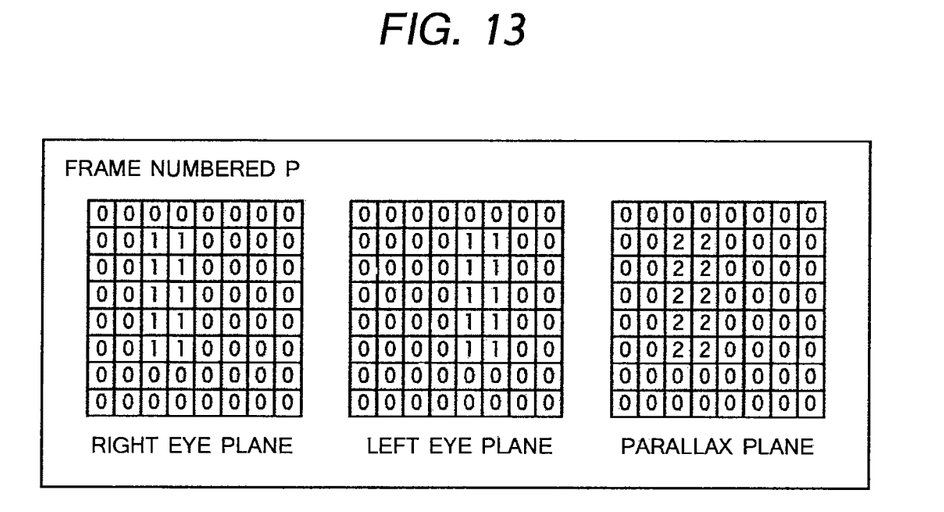
FIG. 13 is a diagram that illustrates an example of a right eye plane, a left eye plane, and a parallax plane before the processing by the parallax processing unit is performed.

For example, when the processing target frame is the scene change frame, the case becomes such that Pc=P. Next, it is assumed that the right eye plane, the left eye plane, and the parallax plane of the frame with frame number P are as illustrated in FIG. 13. As illustrated in FIG. 13, the maximum parallax value of the frame with frame number P is 2.

If the frame number and the maximum parallax value shown in FIG. 13 are substituted into variables in Expression (2), the value of α becomes 1.5.

Figure 14:
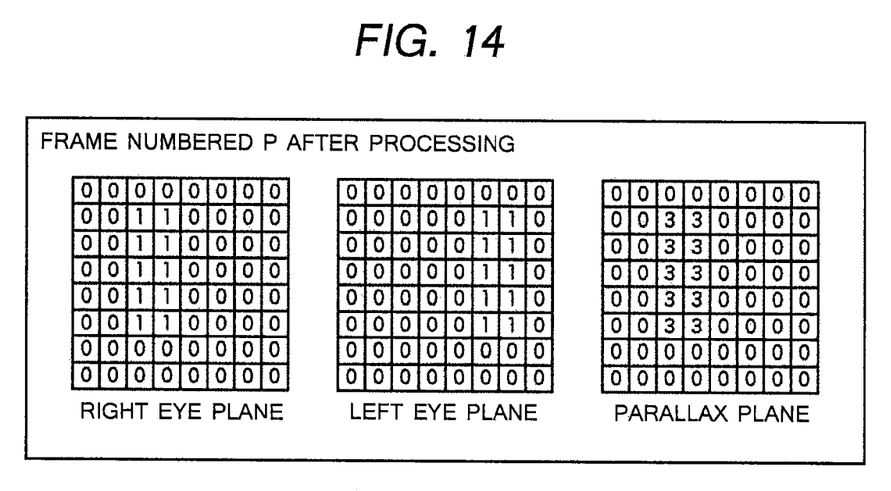
FIG. 14 is diagram that illustrates an example of a right eye plane, a left eye plane, and a parallax plane after the processing by the parallax processing unit is performed.

The parallax adjusting unit 62 multiplies the maximum parallax value in the parallax plane of FIG. 13 by a. In this case, the maximum parallax value is adjusted so as to become 2×1.5=3. Therefore, the right eye plane, the left eye plane, and the parallax plane of the frame with frame number P that has undergone the processing by the parallax processing unit 42 are illustrated in FIG. 14.

After that, the stereoscopic video signal which has undergone the correction of the parallax adjustment is output to the display 22.

In this way, it is possible to prevent the temporal discontinuity in parallax change from occurring in the stereoscopic video, and thus user's visual fatigue can be reduced. Since the maximum parallax value of the corrected stereoscopic video signal is adjusted so as to gradually change from the time point at which the scene change occurs, an unnatural impression may not be given to the user.

Figure 15:
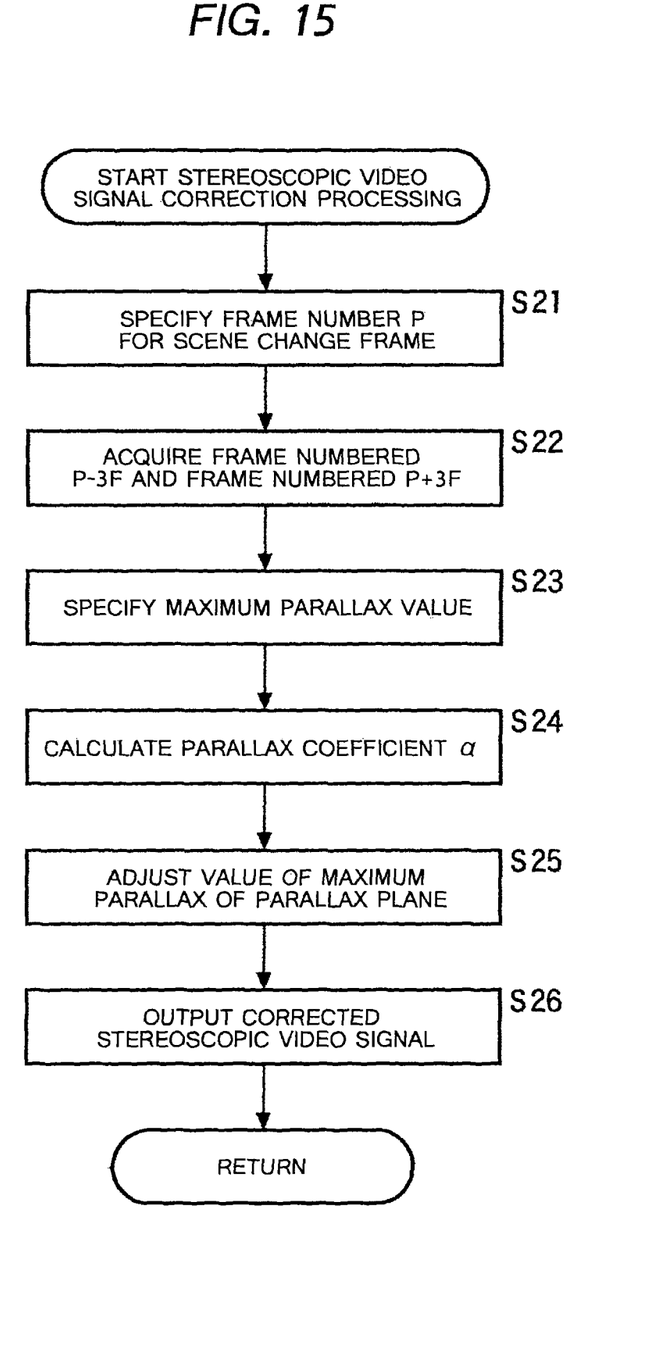
FIG. 15 is a flowchart that describes an example of processing of correcting a stereoscopic video signal.

Next, an example of the processing of correcting the stereoscopic video signal performed by the parallax processing unit 42 will be described with reference to FIG. 15.

In Step S21, the scene change detecting unit 61 specifies the frame number of the scene change frame based on the stereoscopic video signal supplied from the stereoscopic video signal acquiring unit 41. In this case, the scene change detecting unit 61 accumulates, in an internal buffer or the like, the frames of the stereoscopic video signal corresponding to the stereoscopic video, for example, for three seconds, and generates the scene change flag sequence as described above with reference to FIG. 9. Then, the frame number P of the scene change frame is specified based on the scene change flag sequence.

In Step S22, the parallax adjusting unit 62 acquires the frames of the stereoscopic video signal based on the frame number of the scene change frame specified by the scene change detecting unit 61 during the process of Step S21. In this case, the frame with frame number P−180 and the frame with frame number P+180 are acquired.

In Step S23, the parallax adjusting unit 62 specifies the maximum parallax value for the two frames mentioned above. That is, the maximum value among the numerical values of the parallax planes of both the frames is specified.

In Step S24, the parallax adjusting unit 62 calculates the parallax coefficient α by Expression (1).

In Step S25, the parallax adjusting unit 62 adjusts the value of the maximum parallax of the parallax plane.

Further, the processing of Step S24 and Step S25 is performed on each of the frames, from the frame with frame number P−180 to the frame with frame number P+180, that are set as processing target frames. That is, the variable Pc in Expression (1) is sequentially counted up, for example, from P−180 to P+180, and thus the processing of Step S24 and Step S25 is executed.

In Step S26, the parallax adjusting unit 62 outputs the stereoscopic video signal which has been corrected through the processing of Step S25 for adjusting the parallax.

In this way, the processing of correcting the stereoscopic video signal is executed.

The above description has been made based on the premise that the parallax plane is contained in the frame of the stereoscopic video signal. However, the present invention can be applied even to a case where the parallax plane is not contained in the frame of the stereoscopic video signal. When the parallax plane is not contained, the shift of the object in the right eye plane and the left eye plane may be specified, for example, using the block matching process or the like by the parallax processing unit 42, and, as a result, the information similar to the parallax plane may be obtained.

Moreover, the above description has been made based on the premise that the scene change detection flag is contained in the frame of the stereoscopic video signal. However, the present invention can be applied even to the case where the scene change detection flag is not contained in the frame of the stereoscopic video signal. When the scene change detection flag is not contained, the scene change is detected based on, for example, the histogram of the luminance of the pixels of the image data obtained from the stereoscopic video signal beforehand, and, as a result, information similar to the scene change detection flag may be obtained.

In addition, the above description has been made in connection with an example in which the adjustment of the parallax is performed using the scene change frame as a reference frame. That is, the description has been made on the assumption that frame number P in Expression (1) represents the scene change frame. However, the frame used as the reference frame may be specified, for example, based on the change in the maximum value of parallax of each frame. For example, the frame with frame number P and the frame with frame number P+1 are detected which satisfy a condition in which an absolute value of a difference in the maximum parallax value between the frames is equal to or greater than a threshold value. After the detection, the parallax adjustment may be performed based on the frame with frame number P which serves as a reference frame.

A series of processes described above can be executed by hardware, and it also can be executed by software. When the series of processes described above is executed by software, a program that forms the software will be installed into a computer built in special hardware from a network or a recording medium. Moreover, it may be installed, from a network or a recording medium, into a general purpose personal computer 700 or the like, illustrated in FIG. 16, into which various kinds of programs are installed and thus the computer can execute various functions.

Figure 16:
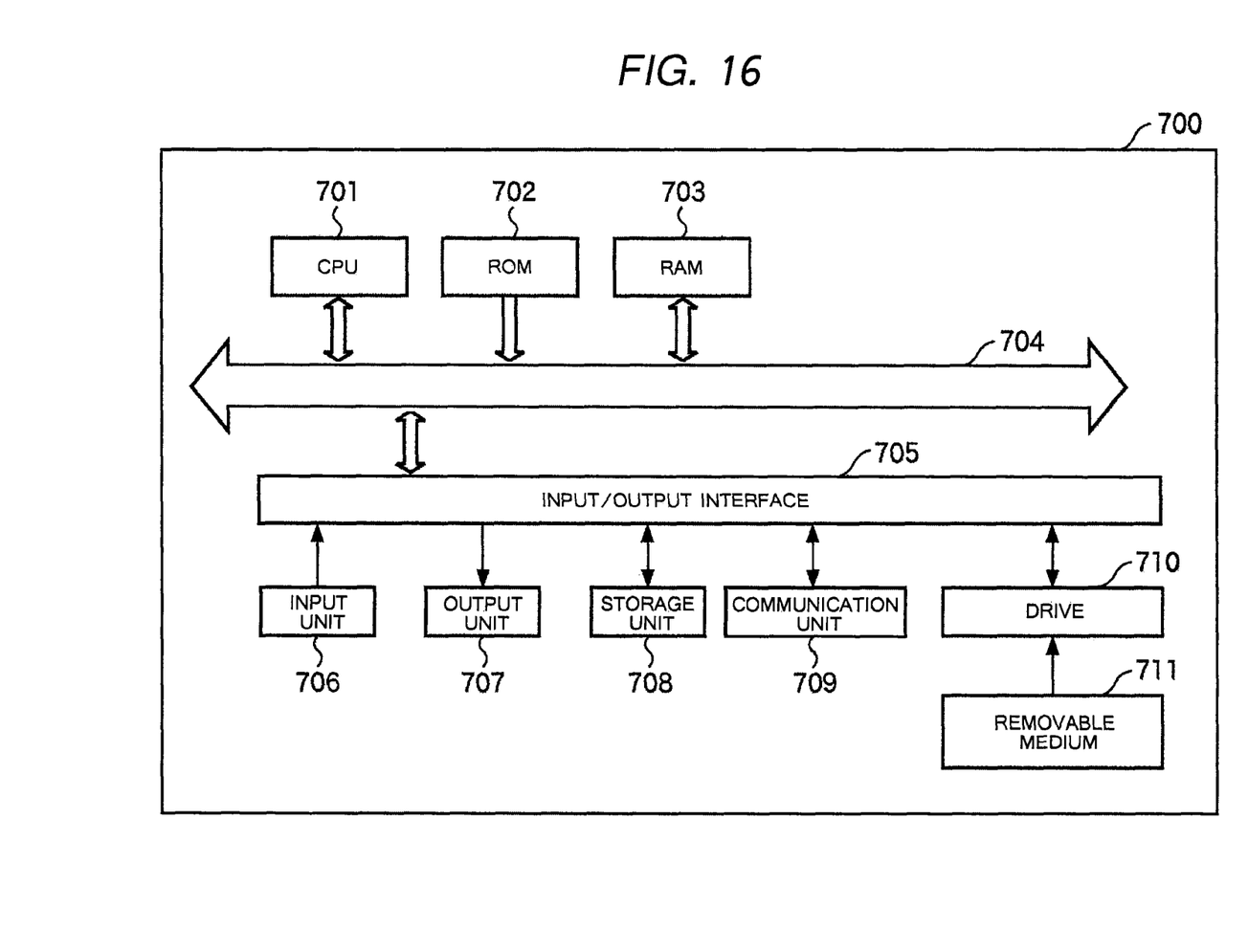
FIG. 16 is a block diagram that illustrates an example of a configuration of a personal computer.

In FIG. 16, a CPU (Central Processing Unit) 701 executes various kinds of processing according to a program stored in a ROM (Read Only Memory) 702 or a program loaded into a RAM (Random Access Memory) 703 from a storage unit 708. The RAM 703 also appropriately stores data or the like which is necessary for the CPU 701 to execute various kinds of processing.

The CPU 701, the RO M702, and the RAM 703 are connected to one another via a bus 704. An I/O interface 705 is also connected to the bus 704.

The I/O interface 705 is also connected to an input unit 706 configured to include a keyboard, a mouse or the like, a display configured to include an LCD (Liquid Crystal Display), and an output unit 707 configured to include a speaker or the like. Moreover, the I/O interface 705 is even connected to the storage unit 708 configured to include a hard disk or the like, a communication unit 709 configured to include a modem, or a network interface card, such as a LAN card. The communication unit 709 performs a communication process through a network including the Internet.

The I/O interface 705 is also connected to a drive 710 if necessary, and a removable medium 711 such as a magnetic disk, an optical disk, a magnet-optical disk, a semiconductor memory is appropriately mounted. And, the computer program read from the removable medium is installed into the storage unit 708, if necessary.

When the series of processes described above is executed by using software, a program that composes the software is installed from a network such as the Internet, or a recording medium such as the removable medium 711.

In addition, the recording medium is configured by using a magnetic disk (including a floppy disk (registered trademark), an optical disk (including a CD-ROM (Compact Disk-Read Only Memory) and a DVD (Digital Versatile Disk)), a magneto-optical disk (including an MD (Mini-Disk) (registered trademark)), or the removable medium 711 configured by using a semiconductor memory or the like, in each of which a program is stored and each of which is distributed separately from the main body of the apparatus illustrated in FIG. 16 to deliver the program to the user. Besides, the recording medium may be configured by using the ROM 702, a hard disk contained in the storage unit 708, or the like in which the program is recorded and which is delivered to the user in the state of being embedded in the main body of the apparatus.

Moreover, the series of processes which has been described above in the specification of the present application includes not only processes which are performed in time series along the description order but also processes which are executed in parallel with each other or individually.

Moreover, embodiments of the present invention are not limited to the above-described embodiments but may be modified in various forms within the scope without departing from the spirit of the invention.

REFERENCE SIGNS LIST

10 Stereoscopic video display system
21 Stereoscopic video display apparatus
22 Display
41 Stereoscopic video signal acquiring unit
42 Parallax processing unit
61 Scene change detecting unit
62 Parallax adjusting unit

The invention claimed is:

1. A stereoscopic video processing apparatus comprising:
a frame specifying unit that specifies a frame that causes a temporal discontinuity in change of maximum parallax value among frames of a stereoscopic video signal that includes frame rate for a unit time;
a maximum parallax specifying unit that specifies a maximum parallax value of a first frame that precedes a reference frame by a predetermined time when the specified frame is set as the reference frame, and a maximum parallax value of a second frame that lags behind the reference frame by the predetermined time;
a parallax coefficient calculating unit that sets frames between the first frame and the second frame as a processing target frame and calculates a parallax coefficient that is coefficient used to adjust the maximum parallax value of the processing target frame such that changes in the maximum parallax value are continuous over time based on the maximum parallax value of the first frame, the maximum parallax value of the second frame, and the maximum parallax value of the processing target frame; and
a parallax adjusting unit that adjusts the maximum parallax value of the processing target frame by multiplying the maximum parallax value by the calculated parallax coefficient.

2. The stereoscopic video processing apparatus according to claim 1, wherein a parallax of each of the frames of the stereoscopic video signal is information contained in each of the frames of the stereoscopic video signal, and is specified based on a parallax plane that indicates a parallax for each pixel.

3. The stereoscopic video processing apparatus according to claim 1, wherein the parallax of each of the frames of the stereoscopic video signal is specified by calculating a difference in pixel between right eye image data and left eye image data that are contained in each frame of the stereoscopic video signal.

4. The stereoscopic video processing apparatus according to claim 1, wherein the frame specifying unit specifies the frame which causes a temporal discontinuity in change of the maximum parallax value by detecting a scene change frame in a video of the stereoscopic video signal.

5. The stereoscopic video processing apparatus according to claim 1, wherein the frame specifying unit specifies the frame which causes a temporal discontinuity in change of the maximum parallax value based on a difference in the maximum parallax value between two frames that are temporally consecutive.

6. A method of processing a stereoscopic video, the method comprising:
- at a frame specifying unit, specifying a frame which causes a temporal discontinuity in change of maximum parallax value among frames of a stereoscopic video signal that has frame rate for each unit time;
- at a maximum parallax specifying unit, setting the specified frame as a reference frame, and specifying a maximum parallax value of a first frame that precedes the reference frame by a predetermined time and a maximum parallax value of a second frame that lags behind the reference frame by the predetermined time;
- at a parallax coefficient calculating unit, setting a frame between the first frame and the second frame as a processing target frame, and calculating a parallax coefficient that is coefficient used to adjust a maximum parallax value of the processing target frame so that changes in the maximum parallax value are temporally continuous, based on the maximum parallax value of the first frame, the maximum parallax value of the second frame, and the maximum parallax value of the processing target frame; and
- at a parallax adjusting unit, adjusting the maximum parallax value of the processing target frame by multiplying the maximum parallax value of the processing target frame by the calculated parallax coefficient.

7. A program causing a computer to function as a stereoscopic video processing apparatus, the stereoscopic vide processing apparatus including:
- a frame specifying unit that specifies a frame that causes a temporal discontinuity in change of maximum parallax value among frames of a stereoscopic video signal that includes frame rate for a unit time;
- a maximum parallax specifying unit that specifies a maximum parallax value of a first frame that precedes a reference frame by a predetermined time and a maximum parallax value of a second frame that lags behind the reference frame by the predetermined time when the specified frame is set as the reference frame;
- a parallax coefficient calculating unit that sets frames between the first frame and the second frame as a processing target frame and calculates a parallax coefficient that is coefficient used to adjust the maximum parallax value of the processing target frame such that changes in the maximum parallax value are continuous over time based on the maximum parallax value of the first frame, the maximum parallax value of the second frame, and the maximum parallax value of the processing target frame; and
- a parallax adjusting unit that adjusts the maximum parallax value of the processing target frame by multiplying the maximum parallax value by the calculated parallax coefficient.

* * * * *